United States Patent [19]

Taya et al.

[11] Patent Number: 4,852,162

[45] Date of Patent: Jul. 25, 1989

[54] SUBSCRIBER LINE INTERFACE CIRCUIT

[75] Inventors: Takashi Taya; Toshiyuki Tahara, both of Tokyo, Japan

[73] Assignee: Oki Electric Industry Co., Ltd., Tokyo, Japan

[21] Appl. No.: 178,349

[22] Filed: Apr. 6, 1988

[30] Foreign Application Priority Data

Apr. 6, 1987 [JP] Japan .................................. 62-82859

[51] Int. Cl.$^4$ ........................................... H04M 19/00
[52] U.S. Cl. .................................... 379/413; 379/399
[58] Field of Search ............... 379/324, 345, 397, 398, 379/400, 413, 405, 412, 406, 395; 370/32.1

[56] References Cited

U.S. PATENT DOCUMENTS

| 4,491,700 | 1/1985 | Tahara et al. | .................... 379/345 X |
| 4,723,280 | 2/1988 | Meier et al. | ......................... 379/413 |
| 4,764,956 | 8/1988 | Rosch et al. | .................... 379/412 X |

FOREIGN PATENT DOCUMENTS 0054160  5/1981  Japan .................................. 379/399

OTHER PUBLICATIONS

Denis W. Aull et al., "A High–Voltage IC for a Transformerless Trunk and Subscriber Line Interface", IEEE Journal of Solid–State Circuit, vol. SC-16, No. 4, pp. 261-266, Aug. 1981.

Primary Examiner—Jin F. Ng
Assistant Examiner—Randall S. Vaas
Attorney, Agent, or Firm—Wenderoth, Lind & Ponack

[57] ABSTRACT

The present invention describes a low power consumption type subscriber line interface circuit (SLIC). The SLIC described in the present invention includes a first pair of potential detectors each of which detects the potential difference between each corresponding subscriber line and a first predetermined value, a second pair of potential difference detectors each of which detects a potential difference between each corresponding subscriber line and a second predetermined value, a pair of signal adder circuits each of which sums output signals from one of the first potential difference detectors and one of the second potential difference detectors, and a pair of amplifiers each of which amplifies each output signal from each signal summing circuit and returns a direct current to the each of corresponding subscriber lines.

12 Claims, 5 Drawing Sheets

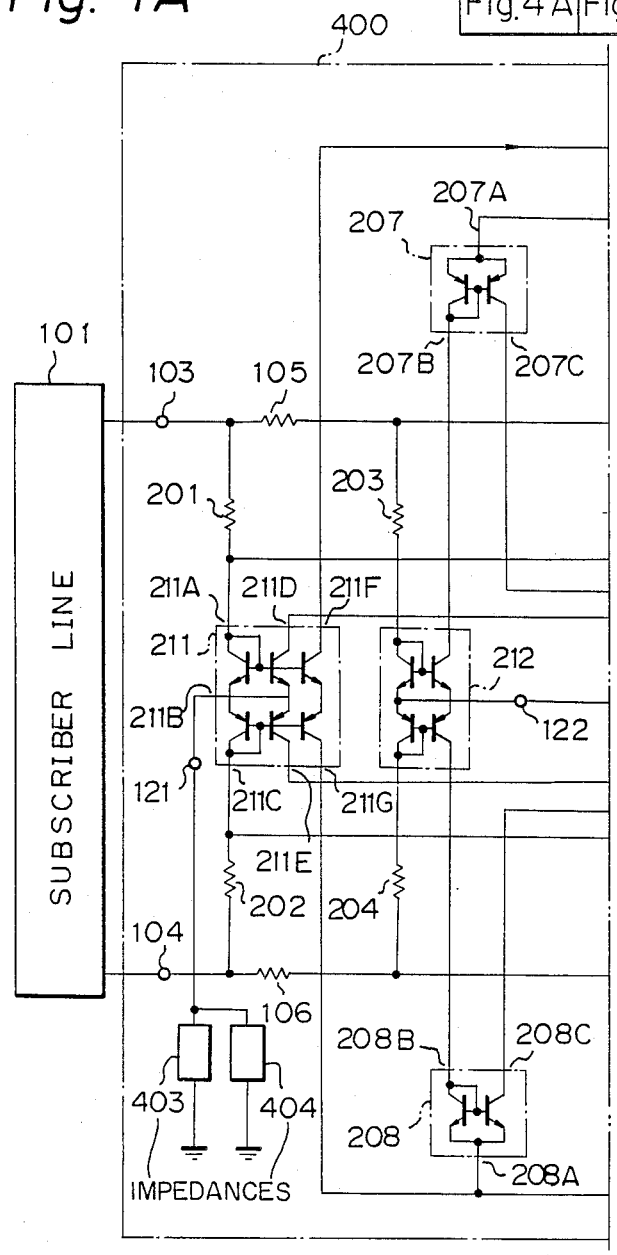

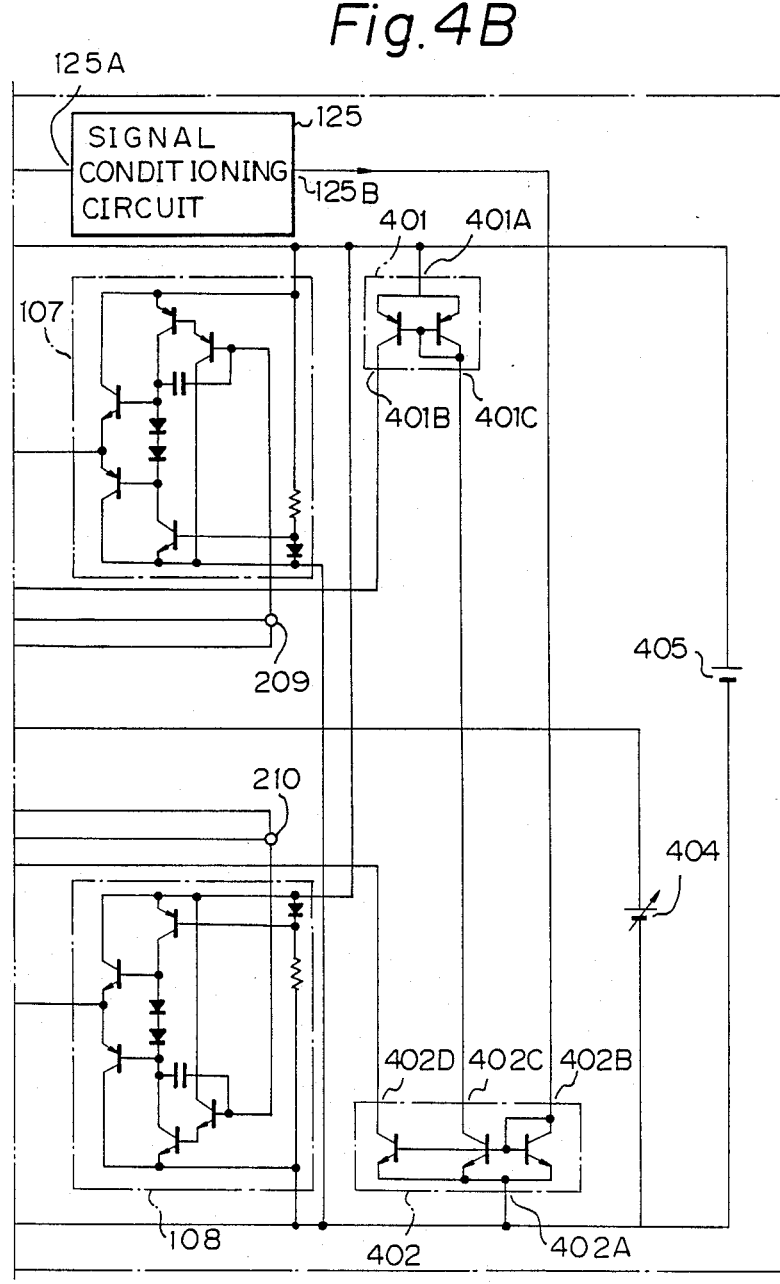

SUBSCRIBER LINE INTERFACE CIRCUIT

BACKGROUND OF THE INVENTION

The present invention relates to a subscriber line interface circuit (hereinafter simply called SLIC), and more particularly to an improved circuit for providing a subscriber line or a trunk with direct current of a telephone switching circuitry.

A conventional SLIC is described in detail in an article by Denis W. Aull et al., entitled "A High-Voltage IC for a Transformerless Trunk and Subscriber Line Interface", IEEE Journal of Solid-State Circuits, volume SC-16, number 4, at pages 261-266, August 1981.

The above mentioned conventional circuit is composed of a differential signal detecting circuit, a common-mode potential detecting circuit and a differential current driving circuit, each of which includes operational amplifiers.

SUMMARY OF THE INVENTION

It is a primary object of the present invention to reduce the electric power consumption of the SLIC by decreasing a number of operational amplifiers.

It is another object of the present invention to provide a SLIC suitable for integrated circuits.

There is provided a SLIC having a first terminal and a second terminal for providing a subscriber line with a direct current, which comprises:
- a first potential detector having a first input terminal and a second input terminal, the first input terminal being connected to the first terminal of the SLIC;
- a second potential detector having a third input terminal and a fourth input terminal, the third input terminal being connected to the second input terminal of the first potential detector, the fourth input terminal being connected to the second terminal of the SLIC;
- the first potential detector outputting a first signal designating a potential difference between the first input terminal and of the second input terminal;
- the second potential detector outputting a second signal designating a potential difference between the third input terminal and the fourth input terminal;
- a first amplifier connected to the first terminal of the SLIC through a first resistor;
- a second amplifier connected to the second terminal of the SLIC through a second resistor;
- a third potential detector having a fifth input terminal and a sixth input terminal, the fifth input terminal being connected to the output terminal of the first amplifier;
- a fourth potential detector having a seventh input terminal and a eighth input terminal, the seventh input terminal being connected to the sixth input terminal of the third potential detector, the eighth input terminal being connected to the output terminal of the second amplifier;
- the third potential detector outputting a third signal designating a potential difference between the fifth input terminal and the sixth input terminal;
- the fourth potential detector outputting a fourth signal designating a potential difference between the seventh input terminal and the eighth input terminal;
- a first signal adder providing the input terminal of the first amplifier with a first summing signal, the first summing signal being sum of the first signal and the third signal; and
- a second signal adder providing the input terminal of the second amplifier with a second summing signal, the second summing signal being sum of the second signal and the fourth signal.

There is further provided another SLIC, according to the present invention having a first terminal and a second terminal for providing a subscriber line with a direct current which comprises: a first current mirror circuit having a first input terminal and a second input terminal; the first input terminal being supplied a first current signal thereto from the first terminal of the SLIC through a first resistor, the second input terminal being supplied a second current signal thereto from the second terminal of the SLIC through a second resistor;
- the first current mirror circuit further having a first output terminal, a second output terminal and a first reference potential terminal, the first output terminal outputting a mirrored first current signal, the second output terminal outputting a mirrored second current signal;
- a first amplifier connected to the first terminal of the SLIC through a third resistor;
- a second amplifier connected to the second terminal of the SLIC through a fourth resistor;
- a second current mirror circuit having a third input terminal and a fourth input terminal, the third input terminal being supplied through a fifth resistor a third current signal thereto from a contact point which connects the third resistor to the output terminal of the first amplifier, the fourth input terminal being supplied through a sixth resistor a fourth current signal thereto from a contact point which connects the fourth resistor to the output terminal of the second amplifier;
- the second current mirror circuit further having a third output terminal, a fourth output terminal and a second reference terminal, the third output terminal outputting a mirrored third current signal, the fourth output terminal outputting a mirrored fourth current signal;
- a third current mirror circuit being supplied with the mirrored third current signal thereto and outputting the third current signal;
- a fourth current mirror circuit being supplied the mirrored fourth current signal and outputting the fourth current signal;
- a first signal adder providing the input terminal of the first amplifier with a first summing signal, the first summing signal being sum of the mirrored first current signal and the third current signal; and
- a second signal adder providing the input terminal of the second amplifier with a second summing signal, the second summing signal being sum of the mirrored second current signal and the fourth current signal.

BRIEF DESCRIPTION OF THE DRAWINGS

FIG. 4A and FIG. 4B area circuit diagram illustrating a third embodiment of a SLIC 400 according to this invention.

DESCRIPTION OF THE PREFERRED EMBODIMENT

Figure 1:
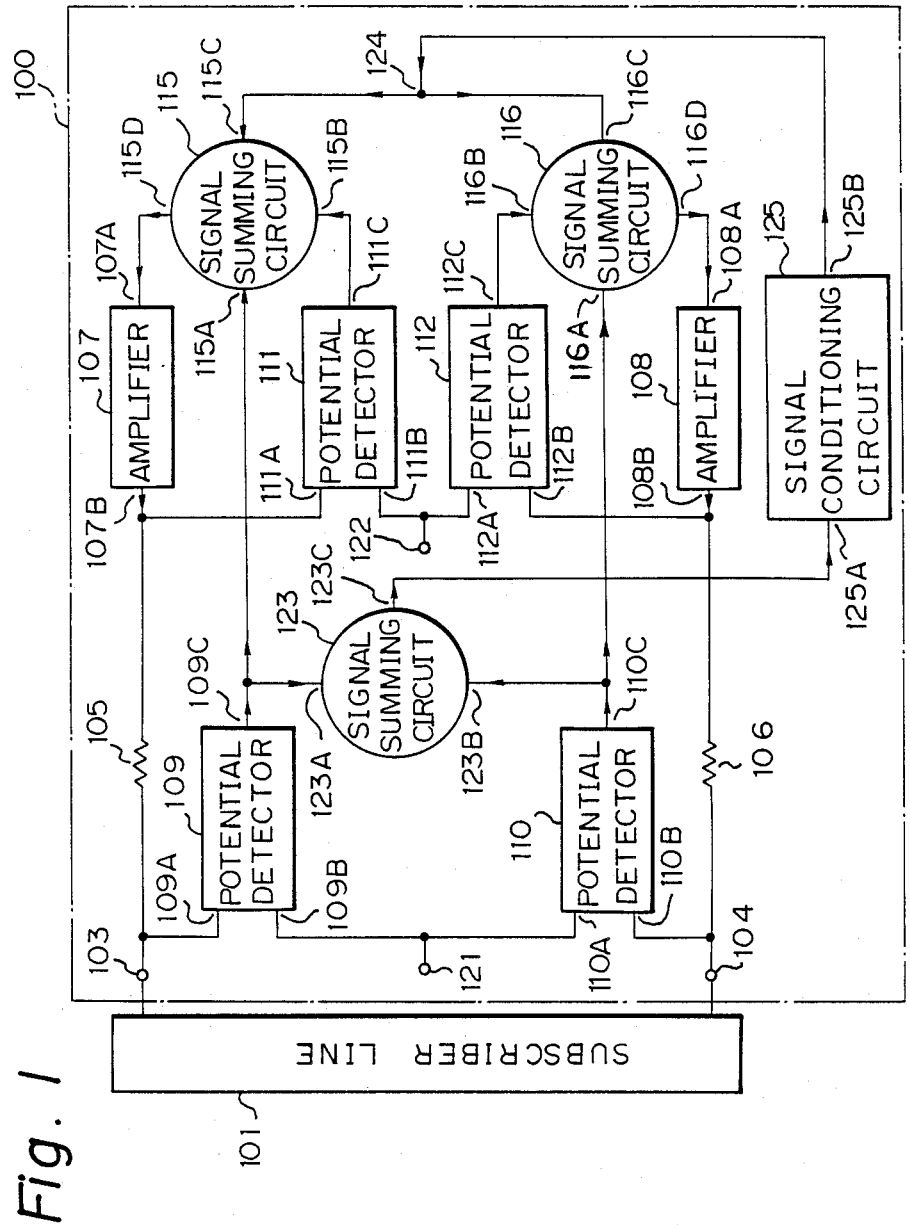
FIG. 1 is a block diagram illustrating a first embodiment of a SLIC 100 according to this invention.
Figure 2:
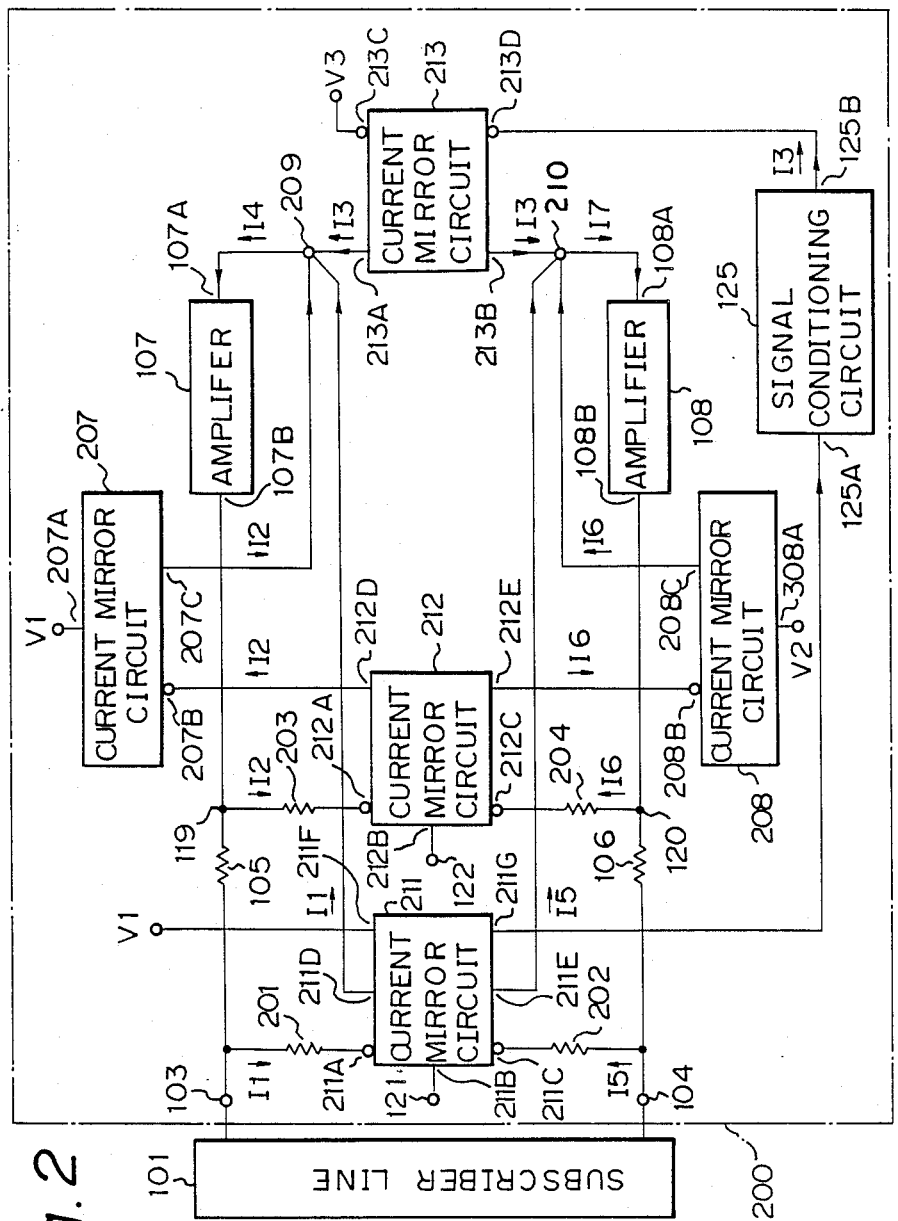
FIG. 2 is a circuit diagram illustrating a second embodiment of a SLIC 200 according to this invention.

In FIG. 1, there is shown a SLIC 100 embodying the present invention which, including amplifiers 107 and 108, provides a subscriber line 101 or a trunk with a direct current while an audio signal passes therethrough to a switching circuitry (not shown) via terminals 103 and 104. The terminal 103 is connected to a terminal 107B of the amplifier 107 through a resistor 105. The terminal 104 is connected to a terminal 108B of the amplifier 108 through a resistor 106. The terminal 103 is further connected so as to supply a first potential to an input terminal 109A of a potential detector 109. The potential detector 109 has another input terminal 109B, to which a terminal 121 is connected for being supplied a second potential, and outputs a first signal designating a potential difference between the first potential and the second potential through an output terminal 109C. The terminal 104 is connected so as to supply a third potential to an input terminal 110B of a potential detector 110. The potential detector 110 has another input terminal 110A, to which the terminal 121 is connected for being supplied the second potential which is at an intermediate level between the first potential and the third potential, and outputs a second signal designating a potential difference between the second potential and the third potential through an output terminal 110C. The output terminal 109C is connected so as to supply the first signal to an input terminal 123A of a signal summing circuit 123. The signal summing circuit 123 has another input terminal 123B to which the output terminal 110C is connected to supply the second signal, and outputs a third signal which is the sum of the first signal and the second signal through an output terminal 123C. The output terminal 123C is connected so as to supply the third signal to a input terminal 125A of a conventional signal conditioning circuit 125 which comprises, for example, a direct current feedback circuit, an alternating current feedback circuit and a hybrid circuit as shown in FIG. 2 of the aforementioned article by D. W. Aull et al. The signal conditioning circuit 125 processes the received third signal to output a drive signal through an output terminal 125B and a contact point 124.

The terminal 107B of the amplifier 107 is connected so as to supply a fourth potential to an input terminal 111A of a potential detector 111. The potential detector 111 also has another input terminal 111B to which a terminal 122 is connected to supply a fifth potential which is at a predetermined fixed potential level, such as half the level of a battery voltage, and outputs a fourth signal designating the potential difference between the fourth potential and the fifth potential through an output terminal 111C. The terminal 108B is connected so as to supply a sixth potential to an input terminal 112B of a potential detector 112. The potential detector 112 has another input terminal 112A to which the terminal 122 is connected to supply the fifth potential, and outputs a fifth signal designating the potential difference between the fifth potential and the sixth potential through an output terminal 112C.

The output terminal 111C is connected so as to supply the fourth signal to an input terminal 115B of a signal summing circuit 115. The signal summing circuit 115 has two other input terminals 115A and 115C; the terminal 115A is supplied the first signal thereto from the potential detector 109; the terminal 115C is supplied the drive signal thereto from the signal conditioning circuit 125. The signal summing circuit 115 further has an output terminal 115D that is connected so as to supply a sixth signal which is the sum of the first signal, the fourth signal and the drive signal to the terminal 107A of the amplifier 107. The output potential of the amplifier 107 varies according to the received sixth signal.

The output terminal 112C is connected so as to supply the fifth signal to an input terminal 116B of a signal summing circuit 116. The signal summing circuit 116 has two other input terminals 116A and 116C; the terminal 116A is supplied the second signal thereto from the potential detector 110; the terminal 115C is supplied the drive signal thereto from the signal conditioning circuit 125. The signal summing circuit 116 further has an output terminal 116D that is connected so as to supply a seventh signal which is the sum of the second signal, the fifth signal and the drive signal, to an terminal 108A of the amplifier 108. The output potential of the amplifier 108 varies according to the received seventh signal.

In this embodiment according to the present invention, each of arrows as shown in FIG. 1 designates a direction of the signal flow. The signals which are supplied to the input terminals of the signal summing circuit 115, 116, 123, are not limited to positive signals but do include negative signals under which the signal summing circuits 115, 116, 123 can act as subtracting circuits. The operation of the circuit shown in FIG. 1 will hereinafter be explained in detail by using equations.

The potential difference V2w of the subscriber line 101 can be described as follows:

$$V2w = V103 - V104 \tag{1},$$

wherein V103 and V104 represent the first potential of the terminal 103 and the third potential of the terminal 104.

Assuming as ignorable currents flowing into the intput terminals 109A, 109B, 110A, 110B of the potential detectors 109, 110, a differential current Id and a common-mode current Ic can be described respectively as follows:

$$Id = (I105 - I106)/2 \tag{2}$$

$$Ic = (I105 + I106)/2 \tag{3},$$

wherein I105, I106 represent the values of the current passing through the resistor 105, 106 respectively.

The first signal S109, the second signal S110, the fourth signal S111, the fifth signal S112 output from the corresponding potential detectors 109, 110, 111, 112 can be described as follows:

$$S109 = K109(V103 - V121) \tag{4}$$

$$S110 = K110(V104 - V121) \tag{5}$$

$$S111 = K111(V119 - V122) \tag{6}$$

$$S112 = K112(V120 - V122) \tag{7},$$

wherein K109, K110, K111, K112 represent proportional constants corresponding to the potential detectors 109, 110, 111, 112. V119, V120 represent potentials of the output terminal 107B, 108B of the amplifiers 107, 108;

V121, V122 represent potentials of the terminals 121, 122.

The third signal S123 from the signal summing circuit 123 can be shown as:

$$S123 = S109 + S110 \qquad (8)$$

Let F(x) be defined as describing a function of the signal conditioning circuit's 125 processing the received third signal S123, then the drive signal from the signal conditioning circuit 125 is described as:

$$\text{appears as } S125 = F(S123) \qquad (9)$$

The sixth signal S115 output from the signal summing circuit 115 is described as:

$$S115 = S109 + S111 + S125 \qquad (10)$$

The seventh signal S116 from the signal summing circuit 116 is described as:

$$S116 = S110 + S112 + S125 \qquad (11)$$

Assuming that gains of the amplifiers 107 and 108 are G107 and G108, respectively, the fourth potential V119 and the sixth potential V120 can be described as follows:

$$V119 = G107 * S115 \qquad (12)$$

$$V120 = G108 * S116 \qquad (13)$$

The foregoing V119 and V120 can be rewritten by using values of the resistors 105, 106 as follows:

$$V119 - V103 = R105 * I105 \qquad (14)$$

$$V120 - V104 = R106 * I106 \qquad (15),$$

wherein R105 represents the value of the resistor 105 and R106 represents the value of the resistor 106.

By substituting S115 of equation (12) for equation (10) and further S109 of equation (4) and S111 of equation (6) for equation (10), the following equation can be achieved:

$$V119/G107 = K109(V103 - V121) + K111(V119 - V122) + S125 \qquad (16)$$

Let a sign of G107 be opposite to that of K111 and let a absolute value of G107 be sufficiently larger than that of K111, since as we can assume V119/G107 = 0, then equation (16) can be described as follows:

$$0 = K109(V103 - V121) + K111(V119 - V122) + S125 \qquad (17)$$

Hence, And put $$K111 = -K109 \qquad (18)$$

equation (17) can be reformed as follows:

$$0 = K109(V103 - V119) + K109(V122 - V121) + S125 \qquad (19)$$

And, further substituting (V119 − V103) of the equation (14) for the equation (19), then the following equation can be obtained:

$$I105 = (V122 - V121)/R105 + S125/(K109 * R105) \qquad (20)$$

Substituting S116 of equation (13) for equation (11); and substitute S110 of equation (5) and S112 of equation (7) for the equation (11), then we can obtain the following equation:

$$V120/G108 = K110(V104 - V121) + K112(V120 - V122) + S125 \qquad (21)$$

Let a sign of G108 be opposite to that of K112 and let an absolute value of G108 be sufficiently larger than that of K112, since we can assume V120/G108 = 0, then equation (21) can be described as follows:

$$0 = K110(V104 - V121) + K112(V120 - V122) + S125 \qquad (22)$$

And, put $$K112 = -K110 \qquad (23)$$

then equation (22) can be replaced as follows:

$$0 = K110(V104 - V120) + K110(V122 - V121) + S125 \qquad (24)$$

And further substituting (V120 − V104) of equation (15) for equation (24), we can obtain the following equation:

$$I106 = (V122 - V121)/R106 + S125/(K110 * R106) \qquad (25)$$

And, put $$K109 = -K110 \qquad (26),$$

$$R105 = R106 \qquad (27)$$

substituting I105 of equation (20) and I106 of equation (25) for equation (2), then the differential current Id is described as follows:

$$Id = S125/(K109 * K105) \qquad (28)$$

Furthermore, substituting S109 of equation (4) and S110 of equation (5) for equation (8) and (V103 − V104) of equation (1) for the substituted equation (8), then the third signal S123 is described as follows:

$$S123 = K109 * V2w \qquad (29)$$

And when we substitute I105 of equation (20) and I106 of equation (25) for equation (3), then the common-mode current Ic is described as follows:

$$Ic = (V122 - V121)/R105 \qquad (30)$$

The equation (28) shows that the subscriber line 101 is supplied with direct current during the time when the signal conditioning circuit 125 outputs the drive signal S125. The equation (29) shows that the signal conditioning circuit 125 can monitor the differential voltage of the subscriber line 101 by detecting the third input S123 designating the potential difference supplied to the subscriber line 101, and that the circuit 125 is also able to transmit and receive an alternating current to and from subscriber terminals through the subscriber line 101. The equation (30) shows that the common-mode current is controllable by selecting the value of the potentials V121 and V122 so that the common-mode noise imposed to the common-mode current is removable by selecting the above value.

In FIG. 2, there is shown a second embodiment of the SLIC according to the present invention. The SLIC 200 comprises current mirror circuits and resistors in place of potential detectors and signal summing circuits which appear in the SLIC 100 shown in FIG. 1 together with the remaining same curcuits bearing the same numerics of FIG. 1.

A current mirror circuit 211 has seven terminals, a first input terminal 211A of which is connected to the terminal 103 through a resistor 201, a reference potential terminal 211B of which is connected to the terminal 121, a second input terminal 211C of which is connected to the terminal 104 through a resistor 202, a first output terminal 211D of which is connected to a terminal 209, a second input terminal 211E of which is connected to a terminal 210; a third input terminal 211F of which is connected to a battery V1 (not shown) which supplies a positive potential to the terminal 211F and a fourth input terminal 211G of which is connected to the input terminal 125A of the signal conditioning circuit 125. The circuitry constructed of the current mirror circuit 211 and resistors 201,202 functions substantially the same as that with the potential detectors 109,110 and the signal summing circuit 123 shown in FIG. 1.

A current mirror circuit 212 has five terminals, a first input terminal 212A of which is connected to the terminal 107B of the amplifier 107 through a resistor 203 and a contact point 119, a reference potential terminal 212B of which is connected to the terminal 122, a second input terminal 212C of which is connected to the terminal 108B of the amplifier 108 through a resistor 204 and a contact point 120, a first output terminal 212D of which is connected to an input terminal 207B of a current mirror circuit 207 and a second output terminal 212E of which is connected to an input terminal 208B of a current mirror circuit 208. The circuitry constructed with the current mirror circuit 212 and the resistors 203,204 functions substantially the same as that having the potential detectors 111,112 shown in FIG. 1.

The current mirror circuit 207 has three terminals, a reference potential terminal 207A which is connected to the battery V1 providing the terminal 207A with a positive potential, the input terminal 207B which is connected to the first output terminal 212D and an output terminal 207C which is connected to the terminal 209. The current mirror circuit 208 has three terminals, a reference potential terminal 208A which is connected to a battery V2 providing the terminal 208A with a negative potential, the input terminal 208B which is connected to the first output terminal 212E and an output terminal 208C which is connected to the terminal 210. Both the current mirror circuits 207,208 function as substantially the same as the signal summing circuits 115,116 shown in FIG. 1 to provide the terminals 209,210 with currents.

A current mirror circuit 213 has four terminals, a first output terminal 213A which is connected to the terminal 209, a second output terminal 213B which is connected to the terminal 210, a third input terminal 213C of which is connected to a battery V3 providing the terminal 213C with a potential with an intermediate level between the positive potential of the battery V1 and the negative potential of the battery V2 and a fourth input terminal 213D which is connected to the output terminal 125B of the signal conditioning circuit 125. And the terminal 209 is connected to the input terminal 107A of the amplifier 107 and the terminal 210 is connected to the input terminal 108A of the amplifier 108.

Figure 3:
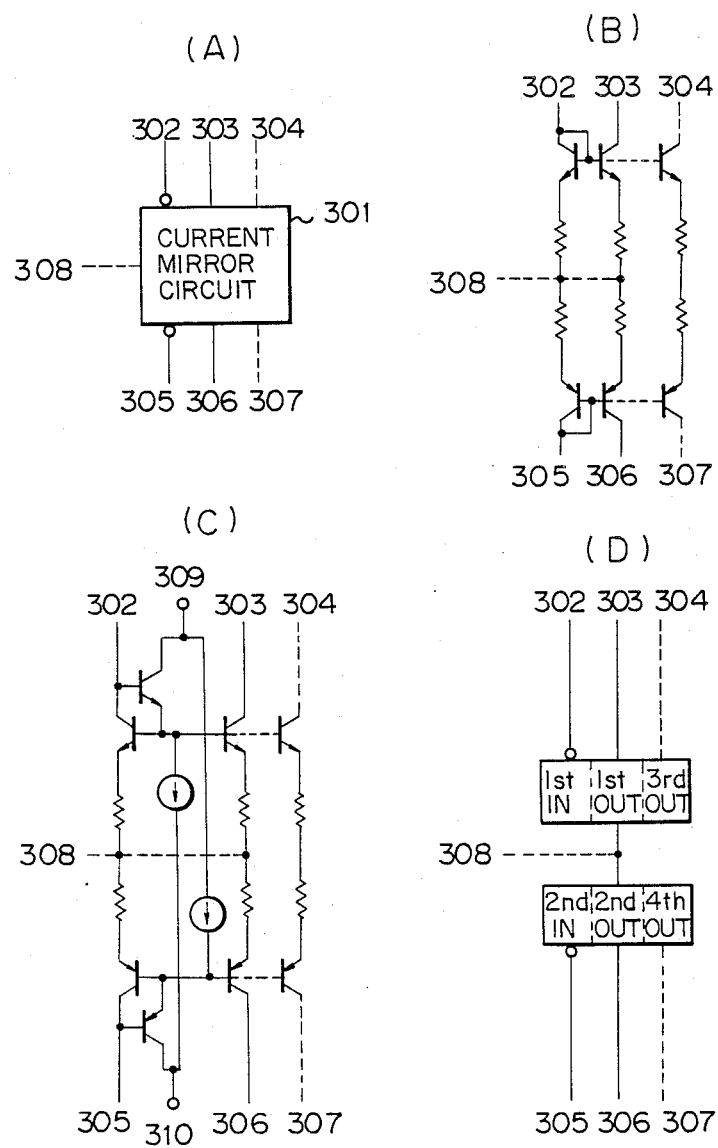
FIGS. 3A-3D are circuit diagrams of various current mirror circuits utilized in the second embodiment.

Each of the current mirror circuits 211, 212, 213 is composed of complementary circuits having two input terminals to which current distinct from each other are supplied, two or more output terminals corresponding to each of the input terminals and the reference potential terminal. In FIG. 3, there are shown various specific circuits 301 embodying the above mentioned current mirror circuits 211,212,213. Each of the circuits shown in FIGS. 3(B)–3(D) is a specific embodiment of FIG. 3(A) where terminals 302-308 of FIG. 3(A) are respectively equivalent to those of FIGS. 3(B)–(D); the terminal 302 is a first input terminal, the terminal 305 is a second input terminal, the terminal 303 is a first output terminal, the terminal 306 is a second output terminal, the terminal 304 is a third output terminal, the terminal 307 is a fourth output terminal, the terminal 308 is a reference potential terminal, the terminal 309 is supplied with a positive potential and the terminal 310 is supplied with a negative potential. Dotted lines shown in FIG. 3 can be provided in cases where there are necessary.

Back to the second embodiment shown in FIG. 2, the terminal 211A of the current mirror circuit 211 is supplied with current I1 proportional to the potential difference between the terminal 103 and the terminal 121.

The current mirror circuit 211 supplies the mirrored current I1 to the terminal 209 through the terminal 211D. The terminal 212A of the current mirror circuit 212 supplied the current I2 proportional to the potential difference between the contact point 119 and the terminal 122. The current mirror circuit 212 supplies the mirrored current I2 to the terminal 207B of the current mirror circuit 207 through the terminal 212D. Further, the current mirror circuit 207, supplies the re-mirrored current I2 to the terminal 209 through the terminal 207C. The signal conditioning circuit 125 supplies the current I3 to the terminal 213D of the current mirror circuit 213 through the output terminal 125B. The current mirror circuit 213 supplies the mirrored current I3 to each terminal 213A and the terminal 213B. The terminal 213A thereof is connected to the terminal 209 which supplies the current I4 to the input terminal 107A of the amplifier 107; the currents I4 being the sum of the current I1,I2 and I3.

The terminal 211C of the current mirror circuit 211 is supplied with current I5 proportional to the potential difference between the terminal 104 and the terminal 121. The current mirror circuit 211 supplies the mirrored current I5 to the terminal 210 through the terminal 211E. The terminal 212C of the current mirror circuit 212 is supplied with current I6 proportional to the potential difference between the contact point 120 and the terminal 122. The current mirror circuit 212 supplies the mirrored current I6 to the terminal 208B of the current mirror circuit 208 through the terminal 212E. The current mirror circuit 208, further, supplies to the terminal 210 the re-mirrored current I6 through the terminal 208C. The terminal 210, to which the terminal 213B of the current mirror circuit 213 is connected so as to supply the mirrored current I3, therefore, supplies to the input terminal 108A of the amplifier 108 a current I7 which is sum of the currents I3,I5 and I6.

The current mirror circuit 211, such as the circuits shown in FIGS. 3(B)–(C), has four output terminals and can supply to the input terminal 125A of the signal conditioning circuit 125 a current proportional to the potential difference between the terminal 103 and the terminal 104.

The terminal 121 of the SLIC 200 can be connected to a constant-voltage battery. As a result, the common-mode input impedance of the SLIC 200 can be decreased. The terminal 121 can be grounded through an appropriate impedance, thus the common-mode current can be kept stable. Since the SLIC 200 can be connected to a common-mode current limiter (not shown), the circuit 200 can be protected from an overcurrent or overload condition such as an accidental grounding of a subscriber line.

In FIG. 4, there is shown a a third embodiment of SLIC according to the present invention. The SLIC 400 comprises current mirror circuit 401, 402, in place of the current mirror circuit 213 of FIG. 2, together with the remaining same circuits bearing same numerics of FIGS. 1–2. And each of the current mirror circuits 207, 208, 211, 212, 401, 402 is specifically shown in FIG. 4. The amplifiers 107, 108 are also respectively and specifically shown as outputting a potential in response to an input of current.

The first output terminal 211D of the current mirror circuit 211 and the terminal 207C of the current mirror circuit 207 are respectively connected to the terminal 209 which supplies to the amplifier 107 a current signal summing a current signal from the terminal 211C and that from the terminal 207C. The second output terminal 211E of the current mirror circuit 211 and the terminal 208C of the current mirror circuit 208 are respectively connected to the terminal 210 which supplies to the amplifier 108 a current signal summing a current signal from the terminal 211E and that from the terminal 208C.

The current mirror circuit 401 has three terminals, a terminal 401A of which is connected to a positive electrode of a direct-current battery 405; a terminal 402B of which is connected to the terminal 211A and a terminal 401C of which is connected to the terminal 402C of the current mirror circuit 402. The current mirror circuit 402 has three other terminals, a terminal 402A of which is connected to a negative electrode of the constant direct-current battery 405, a terminal 402B of which is connected to the terminal 125B of the signal conditioning circuit 125 and a terminal 402D of which is connected to the terminal 211C of the current mirror circuit 311.

The signal conditioning circuit 125 supplies to each of the first input terminal 211A and the second input terminal 211C of the current mirror circuit 211 an output current signal through the current mirror circuits 401, 402 which function substantially the same as the current mirror circuit 213 of FIG. 2.

An impedance circuit 404 having an appropriate impedance value has two terminals, one terminal of which is connected to the terminal 121 and the other of which is grounded, whereby the common-mode current of the circuit 400 can be kept stable. A detector 403 has two terminals, one of which is connected to the terminal 121 and the other of which is grounded. The detector 403, by means of detecting the potential of the terminal 121 and comparing it with that of the terminal 122, protects the circuit 400 from an overcurrent or overload condition such as an accidental grounding of a subscriber line 101.

What is claimed is:

1. A SLIC having a first terminal and a second terminal for providing a direct current to a subscriber line, comprising:

a first potential detecting means having a first input terminal and a second input terminal, the first input terminal being connected to the first terminal of the SLIC;

a second potential detecting means having a third input terminal and a fourth input terminal, the third input terminal being connected to the second input terminal of the first potential detecting means, the fourth input terminal being connected to the second terminal of the SLIC;

the first potential detecting means outputting a first detection signal designating a potential difference between the first input terminal and the second input terminal;

the second potential detecting means outputting a second detection signal designating a potential difference between the third input terminal and the fourth input terminal;

a first amplifying means connected to the first terminal of the SLIC through a first resistor;

a second amplifying means connected to the second terminal of the SLIC through a second resistor;

a third potential detecting means having a fifth input terminal and a sixth input terminal, the fifth input terminal being connected to an output terminal of the first amplifying means;

a fourth potential detecting means having a seventh input terminal and a eighth input terminal, the seventh input terminal being connected to the sixth input terminal of the third potential detecting means, the eighth input terminal being connected to an output terminal of the second amplifying means;

the third potential detecting means outputting a third detection signal designating a potential difference between the fifth input terminal and the sixth input terminal;

the fourth potential detecting means outputting a fourth detection signal designating a potential difference between the seventh input terminal and the eighth input terminal;

a first signal summing means for providing an input terminal of the first amplifying means with a first summing signal, the first summing signal being the sum of the first detection signal and the third detection signal; and a second signal summing means for providing the input terminal of the second amplifying means with a second summing signal, the second summing signal being the sum of the second detection signal and the fourth detection signal.

2. The SLIC according to claim 1, further comprising:

a third signal summing means for outputting a third summing signal, the third summing signal being the sum of the first detection signal on the second detection signal.

3. The circuit according to claim 2, further comprising a signal conditioning means for processing the third summing signal and for providing each of the first signal summing means and the second signal summing means with a fifth detection signal, wherein the first signal summing means outputs the first summing signal by summing the first detection signal, the third detection signal and the fifth detection signals; the second signal summing means outputs the second summing signal by summing the second detection signal, the fourth detection signal and the fifth detection signal.

4. The circuit according to claim 1, wherein the fifth input terminal of the third potential detecting means is connected to the output terminal of the first amplifying means through the first resistor; the eighth input terminal of the fourth potential detecting means is connected to the output terminal of the second amplifying means through the second resistor.

5. The circuit according to claim 1, wherein the sixth input terminal of the third potential detecting means and the seventh input terminal of the fourth potential detecting means are respectively connected to a constant-voltage battery.

6. The circuit according to claim 1, wherein the second input terminal of the first potential detecting means and the third input terminal of the second potential detecting means are respectively grounded through a impedance means having a predetermined impedance value.

7. A SLIC having a first terminal and a second terminal for providing a direct current to a subscriber line, comprising:
 a first current mirror means having a first input terminal and a second input terminal; the first input terminal being supplied with a first current signal from the first terminal of the SLIC through a first resistor, the second input terminal being supplied with a second current signal from the second terminal of the SLIC through a second resistor;
 the first current mirror means further having a first output terminal, a second output terminal and a first reference potential terminal, the first output terminal outputting a mirrored first current signal, the second output terminal outputting a mirrored second current signal;
 a first amplifying means connected to the first terminal of the SLIC through a third resistor;
 a second amplifying means connected to the second terminal of the SLIC through a fourth resistor;
 a second current mirror means having a third input terminal and a fourth input terminal, the third input terminal being supplied through a fifth resistor with a third current signal from a contact point which connects the third resistor with the output terminal of the first amplifying means, the fourth input terminal being supplied through a sixth resistor with a fourth current signal from a contact point which connects the fourth resistor with the output terminal of the second amplifying means;
 the second current mirror means further having a third output terminal, a fourth output terminal and a second reference terminal, the third output terminal outputting a mirrored third current signal, the fourth output terminal outputting a mirrored fourth current signal;
 a third current mirror means supplied with the mirrored third current signal and outputting an equivalent third current signal;
 a fourth current mirror means supplied with the mirrored fourth current signal and outputting an equivalent fourth current signal;
 a first signal summing means for providing the input terminal of the first amplifying means with a first summing signal, the first summing signal being the sum of the mirrored first current signal and the equivalent third current signal; and
 a second signal summing means for providing the input terminal of the second amplifying means with a second summing signal, the second summing signal being the sum of the mirrored second current signal and the equivalent fourth current signal.

8. The circuit according to claim 7, wherein the first current mirror means further comprises a first potential terinal and a current output terminal; the first potential terminal being supplied with a fixed potential; and the current output terminal outputting a fifth current signal proportional to a potential difference between the first terminal of the SLIC and the second terminal of the SLIC.

9. The circuit according to claim 8, further comprising:
 a signal conditioning means supplied with the fifth current signal, the signal conditioning means processing the fifth current signal and outputting a sixth current signal.

10. The circuit according to claim 9, further comprising:
 a fifth current mirror means supplied with the sixth current signal and providing each of the first summing means and the second summing means with the mirrored sixth signal, whereby the first summing means outputs the first summing signal by summing the mirrored first current signal, the equivalent third current signal and the mirrored sixth signal; the second summing means outputs the second summing signal by summing the mirrored second current signal, the equivalent fourth current signal and the mirrored sixth signal.

11. The circuit according to claim 9, further comprising:
 a sixth current mirror means supplied with the sixth current signal and providing the mirrored sixth current signal to a contact point which connects the second resistor with the second input terminal of the first current mirror means.

12. The curcuit according to claim 11, further comprising:
 a seventh current mirror means supplied with the mirrored sixth current signal and providing the sixth current signal to a contact point which connects the first resistor with the first input terminal of the first current mirror means.

* * * * *